Patented June 25, 1929.

1,718,901

UNITED STATES PATENT OFFICE.

ALPHONSE GAMS AND GUSTAV WIDMER, OF BASEL, SWITZERLAND, ASSIGNORS TO THE FIRM: SOCIETY OF CHEMICAL INDUSTRY IN BASLE, OF BASEL, SWITZERLAND.

CONDENSATION PRODUCTS OF UREA AND FORMALDEHYDE AND PROCESS OF MAKING SAME.

No Drawing. Application filed February 17, 1926, Serial No. 88,916, and in Switzerland March 10, 1925.

Our invention relates to the manufacture of hard, opaque or transparent condensation products of urea and formaldehyde. It comprises the process of manufacture thereof and the new products themselves as well as the application of the same in the industry of artificial materials.

Condensation products of formaldehyde and urea are known which contain 2–5 molecules and more of formaldehyde for each molecule of urea. The higher the proportion of formaldehyde the more difficult it becomes to harden the concentrated solutions obtained in the manuacture and the greater is the tendency for the formation of bubbles and cracks.

On these as well as on commercial grounds therefore it is highly desirable that the proportion of formaldehyde to the urea should be diminished.

According to this invention, this object is achieved by proceeding in the following manner: To the clear initial condensation product soluble in water, which is obtained by heating 1 molecular proportion of the urea with at least 2 molecular proportions of formaldehyde in aqueous solution, there is added so much urea that the mixture contains not less than 1.05 molecular proportions of the latter to 2 molecular proportions of formaldehyde. At the same time a small proportion (considerably less than 1 per cent) of acid or a compound yielding acid is added. No reaction occurs. The solution remains as clear as before. From this solution the solvent water is nearly completely separated at a low temperature in a vacuum, whereby a clear viscous liquid soluble in water is produced. This liquid is allowed to pass into the hard solid final condition by leaving it at rest for a long time or by gently warming it for a short time  The urea and the acid or substance yielding acid may be added to the soluble condensation product after the concentration or in any desired stage thereof, in which case the mixture is subsequently further concentrated to the desired degree of dehydration.

By using small proportions of the urea, say a proportion of 1.1 molecules of the urea to 2 molecules of formaldehyde, there are obtained clear, transparent final products; as the proportion of the urea is increased milky, translucent, and finally completely opaque, hard, white masses resembling procelain are obtained. In the case of the last-named products the progress of the hardening operations can be detected very easily, for the solution, at first clear, begins to grow turbid from the edges when heated, owing to the heat absorbed, until finally the whole mass is no longer transparent.

On adding urea to the soluble condensation product the degree of viscosity of the solution is so strongly diminished that it becomes possible to separate the water, with the exception of a small percentage, and thus to obtain masses which are poor in water, but, notwithstanding, flow easily and can be poured. Moreover, the danger of the formation of bubbles and cracks during the subsequent hardening at a raised temperature is eliminated.

Before conversion into the solid condition there can be incorporated in the mass filling materials of fibrous, pulverulent or liquid character, or agents conferring elasticity, or colouring matters. The condensation products obtained can be turned, bored, sawn, filed or otherwise worked and when polished exhibit high lustre.

By the term "urea" also its derivatives, such as thiourea and the like and by the term "formaldehyde" also its polymers are comprised.

The following examples illustrate the invention, the parts being by weight:—

*Example 1.*

120 parts (2 moles) of urea are dissolved in 320 parts of neutral formaldehyde of 38 per cent strength (4 moles). The solution is heated for 3–4 hours in an autoclave at a temperature somewhat above 100° C. To the clear solution thus obtained 12 parts (1/5 mole) of urea and 0.25 parts of ammonium chloride are added. The solvent water is then distilled to a high degree in a vacuum at a water-bath temperature of 40–50° C. until a clear, viscous liquid is produced; this is poured into moulds and heated to 60–70° C. In a short time there is obtained a hard, transparent condensation product.

Example 2.

120 parts of urea are dissolved in 320 parts of neutral formaldehyde of 38 per cent strength and the solution is heated for 30 hours in a reflux apparatus on the water-bath. The solution is concentrated at a low temperature in a vacuum and then mixed with a solution of 20 parts of urea, 0.125 part of sulphuric acid in 20 parts of water and further evaporated at a low temperature in a vacuum. The residue is then poured into moulds and hardened by heating as described in Example 1 or by standing. There is produced a translucent, white product.

Example 3.

To the clear preliminary condensation product obtained as described in Example 1 or 2 are added 40 parts (2/3 mole) of urea and 0.5 part of ammonium chloride. The solution produced is distilled at a low temperature, as prescribed in Example 1, so long as the residue can still flow. This residue is now poured into moulds and hardened by a gentle heating. There is obtained a hard white, non-transparent product.

Example 4.

120 parts of urea are dissolved in 320 parts of neutral formaldehyde of 38 per cent strength and the solution is heated under pressure as described in Example 1. To the syrup, which is as clear as water, 30 parts of urea are added and the whole is heated for one hour on the water-bath. It is then concentrated at low temperature in a vacuum, whereupon there are added 0.5 part of phosphoric acid of 50 per cent strength and 1 part of pyridine in 10 parts of water. The solution is freed from water in high degree and the residue is poured into moulds. Hardening occurs very rapidly by heating to about 70° C. There is produced an opaque, hard, white mass.

Example 5.

120 parts (2 moles) of urea are heated with 330 parts (4.1 moles) of neutral formaldehyde of 38 per cent strength as described in Example 1. To the solution, which is as clear as water, there are added 42 parts (7/10 mole) of urea and the whole is concentrated at a low temperature. There is then added 0.2 part of ammonium sulphate dissolved in 10 parts of water. The solution is further concentrated and the residue poured into moulds. There is thus produced a completely clear syrup, which when hardened at 60–79° C. yields a white, feebly translucent, hard product resembling alabaster.

Having now particularly described and ascertained the nature of our said invention and in what manner the same is to be performed, we declare that what we claim is:—

1. Process for the manufacture of condensation products from urea and formaldehyde by adding to the initial condensation product soluble in water, made from one molecular proportion of urea to at least two molecular proportions of formaldehyde, a quantity of urea sufficient to bring the proportion to not less than 1.05 molecules of urea to 2 molecules of formaldehyde and then forming the final insoluble product.

2. Process for the manufacture of condensation products from urea and formaldehyde by adding to the initial condensation product soluble in water, made from one molecular proportion of urea to at least two molecular proportions of formaldehyde, a quantity of urea sufficient to bring the proportion to not less than 1.05 molecules of urea to 2 molecules of formaldehyde and then forming the final insoluble product in presence of a substance having acid reaction, the quantity of said acid substance being considerably less than 1 per cent calculated on the amount of urea used.

3. As articles of manufacture hard, non-porous condensation products from urea and formaldehyde, which contain in their molecule the constituents of more than one molecule of urea to two molecules of formaldehyde, and which are obtained by reacting upon the solution of a primary condensation product of urea and formaldehyde, containing at least two molecular proportions of formaldehyde to one molecular proportion of urea, with a further quantity of urea sufficient to bring the proportion to more than one molecule of urea of two molecules of formaldehyde, evaporating the solution, and hardening the remaining product in presence of a small quantity of an acid, the thus obtained products being characterized by their low water content, and in consequence thereof, by their high stability.

In witness whereof we have hereunto signed our names this 3rd day of February, 1926.

ALPHONSE GAMS.
GUSTAV WIDMER.